INVENTOR.
RALPH E. DUNLAP
BY John S. Roberts, Jr.
ATTORNEY

March 1, 1960

R. E. DUNLAP 2,926,717

ANTI-SKID TIRE CHAIN

Filed March 10, 1959

INVENTOR.
RALPH E. DUNLAP
BY John S. Roberts, Jr.
ATTORNEY

United States Patent Office 2,926,717
Patented Mar. 1, 1960

2,926,717

ANTI-SKID TIRE CHAIN

Ralph E. Dunlap, Hockessin, Del.

Application March 10, 1959, Serial No. 798,448

3 Claims. (Cl. 152—226)

This invention relates to an improved anti-skid device for vehicle tires, and more particularly to an anti-skid tire chain device having rigid U-shaped cross tread members, a linkage means holding and positioning said rigid cross tread members to and about the circumference of a tire and a fastening means positioned on the front or outer surface of the tire and adapted to secure said tire chain device to said tire.

There has been a considerable amount of development in tire chains in an attempt to develop an anti-skid device which can be applied to a wheel without jacking up the wheel or rotating the wheel or moving the car in some way to apply the anti-skid device. The developments in every instance have produced chains which are either too bulky to be readily stored; which are awkward to install; which do not provide cross-tread links uniformly about the annular or circumferential portion of the tire; or which require reaching behind or to the inner side of the tire to fasten said anti-skid device on the tire.

Basically, the present invention comprises a series of U-shaped rigid cross-tread members extending across the annular or circumferential face of the tire, the upright portions of the U-shaped members extending substantially radially in towards the center of the tire and bearing on the inner and outer surfaces of the tire. For the purpose of this invention the inner and outer surfaces are defined as those surfaces of the tire facing inwardly towards the car frame and outwardly away from the car frame respectively. The cross-tread members are adapted to be uniformly and closely spaced about the circumference of the tire, with the inner and outer upright portions being attached to and joined by elongated, arcuately held and substantially parallel inner and outer flexible side chain linkage means adapted to securely hold them to the circumference of the tire and to position them in designated locations also about the circumference of the tire, said inner and outer linkage means being substantially concentric with the annular surface of the tire. On the outer side of the tire the side chain linkage means is discontinuous having free ends joined by a turnbuckle means or other similar article, and in a similar sense as will be more clearly disclosed on further description of the invention, the inner side chain linkage means must also be discontinuous. However, nothing is required to join the free ends of the inner linkage means due to the nature of the terminal cross-tread members positioned at and between the free ends of said inner and outer linkage means thus obviating any necessity of reaching behind the tire to fasten the anti-skid device. These terminal cross-tread members, defined as those cross-tread members to which the above mentioned free ends of the parallel side chain linkage means are attached, are preferably formed of rigid U-shaped bar stock capable of maintaining a particular shape under normal usage and driving stress placed thereon. The rigid terminal members in combination with the substantially parallel but discontinuous inner and outer linkage means and the outer turnbuckle means thus provide a device which in and of itself will be securely held to the circumference of a tire without the necessity of additional inner joining means for the free ends of the inner linkage, and which additionally can be longitudinally extended so as to be readily placed over the annular surface of the tire. To additionally improve on the positioning and rigidity of the anti-skid device, and to relieve some of the shearing stress forces applied to the terminal cross-tread members additional inner chain linkages are preferably positioned on the inner side of the tire directly between the upright portions of the terminal cross-tread members and the inner upright portion of a cross-tread member centrally positioned between said first mentioned members.

Thus it is evident from the above description that an anti-skid device is provided which is capable of being longitudinally extended so as to be easily and readily wrapped about the circumferential or annular portion of the tire, the center of the anti-skid device being positioned at the top of the tire, and which by means of a single fastening point on the outer face of the tire is capable of being firmly secured thereto, without the necessity of additional fastening means on the inner face of the tire.

Thus it is an object of the present invention to provide an anti-skid tire chain which can be secured to a tire without jacking up the wheel on which the tire is mounted, or which can be secured to a tire without moving or rotating the tire in any way to apply the tire chain.

It is another object of the invention to provide a tire chain which can be installed, or applied to the tire without the necessity of reaching behind the tire to fasten the chain in any way.

It is a still further object of the invention to provide an anti-skid tire chain which provides cross-tread links uniformly and closely spaced about the circumference of the tire.

A still further object of the invention is in providing a tire chain which can be easily and compactly stored. Other objects of the invention will become apparent on consideration of the following description and drawings.

Figure 1:
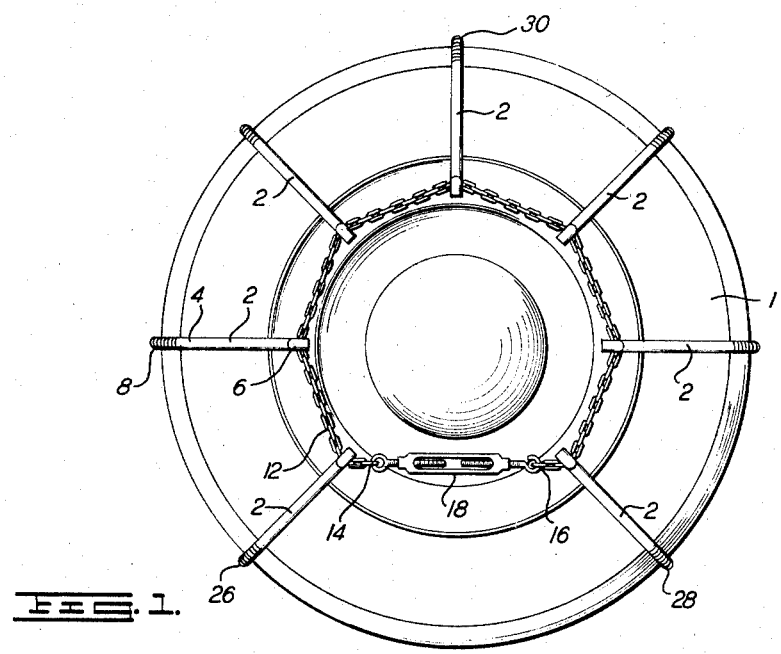
Figure 1 is an outer front view of the tire and anti-skid device applied thereto.
Figure 4:
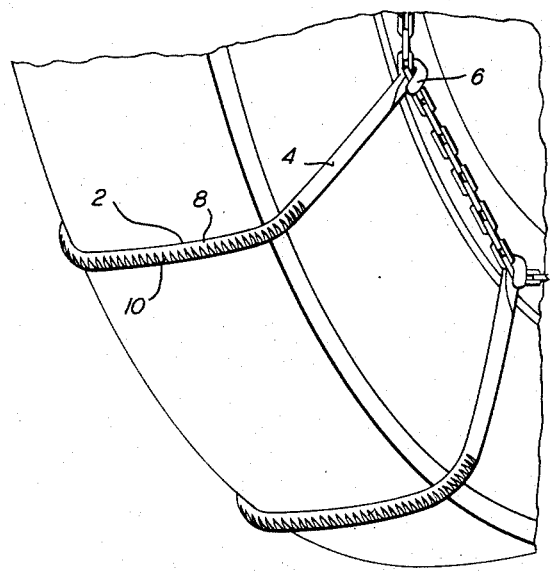
Figure 4 is a perspective view of a cross-tread member of the anti-skid device.

Referring to the drawings Figure 1 showing an outer view of the tire 1 and a preferred embodiment of the invention illustrates U-shaped rigid cross-tread members 2 uniformly and closely spaced about the circumference of the tire having upright portions 4 extending substantially radially inwardly towards the center of the tire and having hooks 6 positioned on the terminal ends of the upright portions. The cross-tread members are designed to have a substantially flat portion 8 clearly shown in Figure 4, adapted to conform to the tread portion of the tire and to extend between the upright portions 4 as shown. The whole cross-tread member is preferably rigidly formed from metal or plastic bar stock or comparable material designed to take a considerable amount of stress and wear. As shown in Figure 4, the tread portion 8 of the cross-tread member may have a serrated outer surface 10 to provide additional gripping action on ice or packed snow.

The cross-tread members are joined together and positioned by means of arcuately held discontinuous chain linkage means 12 extending on the outer side of the tire substantially concentric to the circumference of the tire between the terminal cross-tread members 26 and 28, said linkage means being securely and nonslidably attached to the hooks 6 of the various cross-tread members 2, including the terminal cross-tread members, and having its free ends 14 and 16 joined by turnbuckle 18. The linkage means is preferably formed of metal chain as shown to provide the necessary wearing qualities and required tensional strength, but it is contemplated that nylon cord or wire, or comparable material may be used, or perhaps a material having a slight give or longitudinal yield may be found desirable. Also any joining means can be used equivalent to a turnbuckle, but it should be capable of adjustably fastening the free ends to provide a desired tension on the chain linkage 12 when the device is applied to a tire and should preferably be capable of tightening the chain to tires of different diameters. Also the hooks 6 of the cross-tread members shown in Figure 4 as extending through the chain links to grip them are intended to be any means capable of non-slidably securing the upright portions of the cross-tread members to chain linkages or equivalent linkages and of preventing circumferential or radial displacement of the cross-tread members with respesct to each other.

Figure 2:
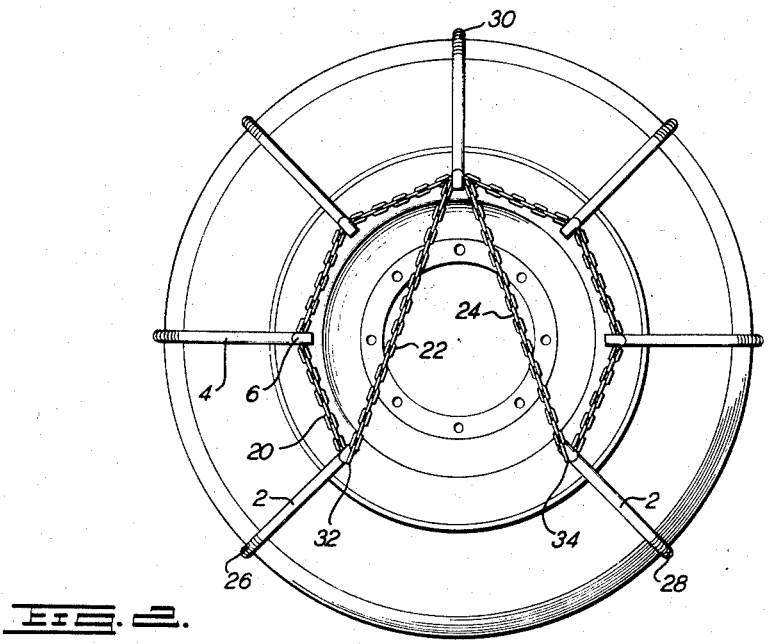
Figure 2 is an inner view of the tire and anti-skid device applied thereto.

Figure 2 showing the inner face of the tire and an inner view of the preferred embodiment of the anti-skid device, illustrates the inner chain linkage 20 as a continuous arcuately held chain extending about and substantially concentric to the outer circumference of the tire between the terminal cross-tread members 26 and 28 and additionally having portions 22 and 24 forming a substantially V-shape extending between the terminal cross-tread members 26 and 28 and the centrally located cross-tread member 30, but characterized by an absence of any linkage extending directly between said terminal cross-tread members. In view of this absence of inner linkage extending directly between the terminal members, and to comply with the above definition defining the terminal cross-tread members as those cross-tread members to which the free ends of the inner and outer chain linkage means are attached, the portions of the inner linkage means attached to the cross-tread members 26 and 28 at points 32 and 34 shall be defined as the free ends thereof, despite the fact that the inner linkage means is continuous as shown. It is obvious that the inner chain linkage means can actually be discontinuous terminating and having free ends 32 and 34 at the points of attachment with terminal cross-tread members 26 and 28, and that additional and separate chain linkages 22 and 24 can be provided extending between the terminal cross-tread members and the centrally located cross-tread member 30. The important feature is that regardless of the construction of the inner linkages 20, 22 and 24, there must be no linkage extending directly between cross-tread members 26 and 28, the reason being that the anti-skid device is applied to the tire, as will be more fully described below, in an enveloping or wrapping manner over the circumferential or tread portion of the tire and thus must be capable of being longitudinally extended, at least to the extent of the diameter of the tire.

As disclosed above with respect to the outer linkage means, the inner linkage means may also be comprised of nylon cord, wire, or other equivalent material satisfying the functional requirements mentioned.

The purpose of the V-shaped chain linkage designated by the numerals 22 and 24 is to relieve some of the stress placed upon the end positioned or terminal cross-tread members 26 and 28. The cross-tread members 26 and 28 being rigid are held on to the tire by means of turnbuckle 18, the tension provided by the outer linkage means configuration, and the positioning of the remaining cross-tread members. It is obvious that even without the inner linkage 20 with all cross-tread members being rigid and with the outer linkage means being drawn taut by means of the turnbuckle 18 there is no possibility of the anti-skid device being removed from or coming off the tire. However, it is also apparent there will be a considerable amount of twisting or circumferential and radial movement of the cross-tread members, at least at the inner unjoined portions thereof, thus creating a considerable amount of stress, particularly shearing stress on the bar stock of the cross-tread members.

To avoid this shearing stress, the inner linkage is provided tautly joining the upright portions of the cross-tread members and holding them radially inwardly and in position with respect to each other. The additional V-linkage is provided to relieve at least partially some of the shear stress that would be placed on the terminal cross-tread members resulting from the absence of any linkage directly between the terminal cross-tread members. Without the V-shaped linkage 22 and 24, it is that there would be permitted some twisting and radial movement of the terminal members despite the control provided by inner linkage 20. As a modification, turnbuckle means may also be provided in linkage means 22 and 24 to additionally tighten up on the inner linkage arrangement depending on the diameter of the tire.

Other linkage arrangements on the inner surface of the tire would be operative. For instance the chain linkages 22 and 24 could make an approximate X configuration extending to different cross-tread members. The functional requirements are merely that no additional attachment means on the inner surface be required; that the chain linkage arrangement be such as to permit the anti-skid device to be longitudinally extended so as to slip over the outer circumference of the tire as described below; and that it be adapted to prevent twisting and radial motion of the inner portion of the terminal cross-tread members.

Although the end positioned cross-tread members of the anti-skid device must comprise U-shaped solid bars, and although preferably the centrally positioned cross-tread member be also a U-shaped solid bar, as an additional embodiment the remaining positioned cross-tread members can be the more commonly utilized chain cross-tread links. In such a case, of course there would also be a hook or similar means 6 securely attaching the cross-tread links to the inner and outer chain linkage means as described above.

Figure 3:
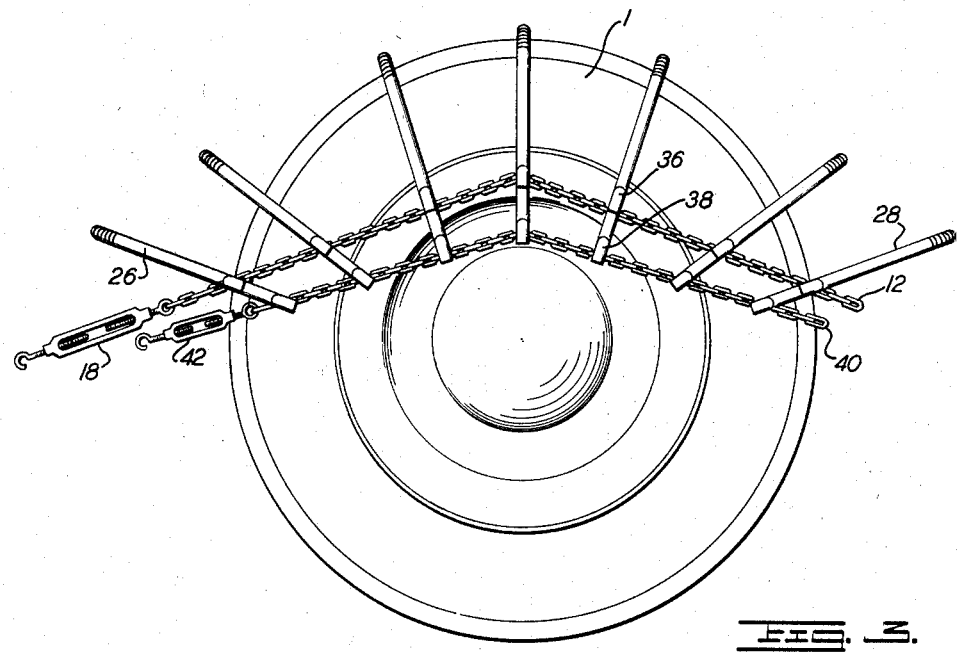
Figure 3 is an outer view of the tire showing a modification of the anti-skid device and the method of applying said device to the tire.

A further modification of the anti-skid device is disclosed in Figure 3. In place of the single hooking means on the cross-tread members as disclosed in Figures 1, 2 and 4, the outer portion of the U-shaped cross-tread members can be provided with double hooks 36 and 38 for the application of two concentric discontinuous outer side chain linkages. The additional chain linkage 40 is also provided with turnbuckle or similar means for joining the free ends thereof. By means of the additional concentric outer chain linkage, additional stability and rigidity for the anti-skid device are provided, and further less twisting movement of the cross-tread members with respect to each other would be experienced.

It can readily be seen from the above discussion and from the drawings that a novel combination is provided as an improvement in anti-skid devices, the combination comprised of a discontinuous inner and outer chain linkage means, rigid cross-tread members equally spaced along the elongated portions of the linkage means and extending between the inner and outer linkage means, terminal or end positioned cross-tread members formed of U-shaped solid bar members, and means joining the free ends of the outer discontinuous chain linkage means. By providing inner and outer chain linkage as discontinuous such that it can be laid out in an elongated manner, and adapted to be substantially concentric with the circumference of the tire, the anti-skid device can be applied to the tire by merely placing it over the tire, the center of the anti-skid device being positioned at the top of the tire, and enveloping the tire in the manner shown in Figure 3. The turnbuckle means provides a simple outer means for drawing the linkage means taut once the device is fitted snugly to the tire and for thus holding the anti-skid device to the tire, a means which can be quickly and simply operated from the outer or front face of the tire. Further, by using solid U-shaped cross bar members at the terminal ends of the discontinuous inner and outer chain linkage means, there is no danger of the anti-skid device being removed from the tire once the chain linkage means is drawn taut by means of the turnbuckle.

The V-shaped linkage between the rear portions of the terminal cross-tread links and the centrally located cross-tread links provides additional rigidity to the anti-skid device, particularly on the rear or inner face of the wheel, and relieves the terminal cross-tread links of some of the shearing and twisting stress placed thereon. Additional concentric outer linkage means can be provided for additional stability.

In the claims:

1. An anti-skid device for tires comprising in combination, at least two rigid U-shaped cross-tread members having inner and outer upright portions and hook means thereon, said upright portions being adapted to press substantially radially on the inner and outer surfaces of said tire, several additional cross-tread members placed at intervals intermediate said rigid cross-tread members, an inner flexible continuous chain linkage means arcuately extending between and attached to said hook means of the inner upright portion of said cross-tread members, said inner linkage extending additionally in substantially a V-shape from each of said rigid cross-tread members to the inner portion of one of the additional cross-tread members, said member being positioned substantially halfway between said rigid cross-tread members, a discontinuous arcuate outer flexible linkage means extending between and having free ends attached to hook means on the outer upright portion of said rigid cross-tread members, and joining means releasably secured from said free end of said outer linkage means adapted to draw both said flexible linkage means taut when said anti-skid device is applied to the tire.

2. An anti-skid device as claimed in claim 1 wherein said additional cross-tread members are U-shaped and formed of rigid bar stock, having hook means on the upright portions thereof.

3. An anti-skid device as claimed in claim 2 wherein the portion of the cross-tread members extending across the treads is serrated.

References Cited in the file of this patent

UNITED STATES PATENTS

| | | |
|---|---|---|
| 1,017,909 | Reid | Feb. 20, 1912 |
| 1,340,184 | Reyburn | May 18, 1920 |
| 2,537,392 | Bettcher | Jan. 9, 1951 |